Patented June 14, 1938

2,120,777

UNITED STATES PATENT OFFICE 2,120,777

FOOD PRODUCT

David Dalsey, Chicago, Ill.

No Drawing. Application June 3, 1936,
Serial No. 83,221

7 Claims. (Cl. 99—207)

My invention relates to food products and has to do more particularly with a concentrate obtained from potatoes or from other tubers and roots, and a method of making the same.

An object of my invention is to provide a concentrate as indicated above which has a combination of properties which render it especially valuable for the manufacture of pancakes and like articles of food. My invention finds its principal application in connection with potatoes, for the production of potato pancakes.

Many formulas and recipes have been suggested heretofore for the preparation of potato pancakes. However, in most cases, the delectable characteristic potato flavor is lost or disguised by less appetizing flavors while, at the same time, a pancake is obtained which is heavy, soggy, or otherwise unattractive.

I also am aware that potatoes have been ground and desiccated to produce meals and flours for use in panification, usually as a diluent for cereal flours. My invention is not concerned with this problem.

An object of my invention is to provide a desiccated product which is especially suitable for the preparation of a pancake. Said product retains for long periods of time all of the attractive natural flavor of the tuber or root and produces a pancake which is of light and fluffy texture, is highly digestible, and is of a beautiful, golden brown appearance.

In accordance with my invention, I produce a desiccated potato product which is a conglomerate of small and large particles. The small particles represent the major portion of the soluble elements of the tuber, which elements are largely responsible for the delicate and elusive flavor and which are usually lost or destroyed in processes of the prior art. The coarser particles represent the insoluble and cellular portions of the tuber and function to impart to a pancake a light, fluffy and porous texture.

Example

The following is a preferred embodiment of my invention and is to be taken merely as illustrative and not as limiting:

The potatoes or other tubers or roots are peeled, trimmed and grated. The juice is then extracted from the grated material in any suitable apparatus, preferably in an ordinary cider press, leaving a residue having a moisture content of from about 30 to 35%.

The press cake is removed from the filter cloth and is dried to a moisture content of from about 5 to 10% in apparatus which will not destroy or materially reduce the coarse shredded texture of the material. I preferably use a rotary vacuum drier at a temperature of about 140° F. The drier is rotated rather slowly, say at about 5–10 R. P. M., to avoid substantially breaking the shreds of material.

The extracted juice is mixed with potatoes which have been cooked by boiling or steaming, using substantially equal weights of juice and potatoes. By combining the juice with cooked potatoes, the drying is simplified, avoiding certain technical difficulties encountered when attempts are made to dry the juice alone. The cooked potatoes are, furthermore, of value in the final product. The combination of juice and cooked potatoes is thoroughly mixed so that the flavor bearing elements of the juice are uniformly disseminated throughout the solid material, and the mixture is then dried at a relatively low temperature. I preferably use for this operation a roller type of drier with a steam pressure of about 3 pounds.

The dried press cake is then combined with the dry material resulting from the last mentioned step in the proportion of about 7 parts by weight of the former to about 3 parts of the latter. However, these proportions may be varied within wide limits.

*Color preservation.*—As is well known, raw potato material darkens very quickly due to enzymic activity, usually ascribed to the enzyme oxydase, inasmuch as the darkening only occurs in the presence of oxygen after raw potatoes have been peeled. In order to produce an attractive potato compound, therefore, it is highly important either that this darkening be prevented or that the product be bleached after it has occurred. I consider it preferable to prevent the darkening by rendering the enzymes ineffective. In attacking this problem, one is closely restricted by reason of the various food and drug laws, Federal and State, relating to adulteration of foodstuffs.

After extensive investigation I have found that the darkening of the raw potato material may be prevented by introducing into the material an edible benzoyl compound of acid reaction. My preferred compound is a material which, under the Federal Food and Drug Act, may be introduced into a food compound without any special labeling, said compound being a mixture of benzoyl peroxide and tricalcium phosphate, known on the market as Novadelox. This material is ordinarily used as an oxydizing agent as in the bleaching of flour. It is not, however, used for bleaching in my invention. The effectiveness of this material for my purpose is quite surprising to any chemist familiar with the problem, because the peroxide, as would be expected, is highly oxidizing and would therefore be assumed to hasten the darkening. However, as stated above, I have established, after considerable research, that the benzoyl radical functions effectively to destroy the enzymic action in spite of the oxygen. Other compounds which may be used for the same purpose are benzoic acid and benzoyl chloride and, in fact, any benzoyl compound of acid reaction which may be consumed without harm by an animal organism.

I preferably introduce the enzyme deterrent to the grated potato material before the same is pressed in the proportion of not more than about one-tenth of one per cent by weight of the finished material. However, I find that a very minute quantity produces the desired result, down to 1 part by weight of benzoic acid in 4,000 of the finished material.

The desiccated material embodying my invention consists of a mixture of coarse and fine particles, the coarse particles being in the form of shreds, representing the raw fibrous material, while the fine material represents the expressed water soluble ingredients, including mineral salts, albumins and sugars, which adhere to the cooked potato particles. The soluble materials are very largely responsible for the subtle flavor of a tuber which is so easily lost in ordinary processes. In accordance with my invention, it will be seen that these ingredients are carefully preserved and, since they are dried at relatively low temperatures, they are not destroyed or modified in the course of the process.

Material embodying my invention may be used for the making of pancakes in accordance with any suitable recipe. For example, the desiccated material may simply be mixed with water, preferably with a small proportion of egg, and fried in the usual manner.

Pancakes produced from material embodying my invention are found to be light, fluffy and porous, of delightful flavor, of a golden brown color, and highly digestible. The presence of the coarse shreds provides a network or skeleton structure, insuring the fluffy character above referred to. The presence of the water soluble element adds greatly to the food value, provides the characteristic flavor which is so frequently lost, and at the same time the ingredients thereof, especially the albumins, aid as a binder. The cooked potato material, being highly water absorbent, serves as a filler or binder and is largely responsible for imparting a golden brown color to the finished pancake.

I have found, furthermore, that the procedure of expressing the juice and later recombining it with the shredded residue contributes to a large extent to the desirable physical characteristics shown by my product, and is of importance in rendering the process commercially practical.

The desiccated material embodying my invention is useful not only as a pancake mix but has a wide variety of other culinary applications. For example, said material may be used as a filler in various recipes, such as for fish or meat croquettes or loaves, etc., to which it not only contributes bulk but also a fluffy quality.

Various changes and modifications coming within the spirit of my invention may suggest themselves to those skilled in the art, and hence I do not wish to be limited to the specific details described herein or uses mentioned, except to the extent indicated in the appended claims, which are to be interpreted as broadly as the state of the art will permit.

I claim:

1. A method comprising shredding a raw tuber and removing a major portion of the juice therefrom, drying the shreds in such manner as not to destroy the coarse physical character thereof, combining the extracted juice with a quantity of similar tuber material which has been cooked and drying said mixture, and combining with the product of the last mentioned step said dried shreds.

2. A method comprising shredding a raw tuber and removing a major portion of the juice therefrom, drying the shreds at a relatively low temperature and with a minimum of agitation, combining the extracted juice with a quantity of similar tuber material which has been cooked and drying said mixture at a low temperature, and combining with the product of the last mentioned step said dried shreds.

3. A method comprising shredding raw potato and removing a major portion of the juice therefrom, drying the shreds at a relatively low temperature and with a minimum of agitation, combining the extracted juice with a quantity of cooked potato and drying said mixture at a low temperature, and combining with the product of the last mentioned step said dried shreds.

4. As a new article of food, dried tuber material comprising the insoluble elements of the raw product in the form of coarse shreds, the soluble elements of said raw product, and a cooked portion of the same kind of tuber material product.

5. As a new article of food, a dried potato product comprising in admixture the insoluble elements of raw potato in the form of coarse sheds, the soluble elements of raw potato, and cooked potato.

6. As a new article of food, a dried potato product comprising in admixture the insoluble elements of raw potato in the form of coarse shreds, the soluble elements of raw potato, and dried and comminuted cooked potato, the soluble elements being attached to particles of the cooked potato.

7. A dry potato pancake mix comprising a network of coarse shredded raw potato and a filler in a relatively fine state of subdivision consisting of cooked potatoes impregnated with raw potato juice.

DAVID DALSEY.